US011226423B1

(12) United States Patent
Gao et al.

(10) Patent No.: US 11,226,423 B1
(45) Date of Patent: Jan. 18, 2022

(54) MODEL-DRIVEN DEEP LEARNING-BASED SEISMIC SUPER-RESOLUTION INVERSION METHOD

(71) Applicant: XI'AN JIAOTONG UNIVERSITY, Xi'an (CN)

(72) Inventors: Jinghuai Gao, Xi'an (CN); Hongling Chen, Xi'an (CN); Zhaoqi Gao, Xi'an (CN); Chuang Li, Xi'an (CN); Lijun Mi, Xi'an (CN); Jinmiao Zhang, Xi'an (CN); Qingzhen Wang, Xi'an (CN)

(73) Assignee: XI'AN JIAOTONG UNIVERSITY, Xi'an (CN)

( * ) Notice: Subject to any disclaimer, the term of this patent is extended or adjusted under 35 U.S.C. 154(b) by 0 days.

(21) Appl. No.: 17/370,987

(22) Filed: Jul. 8, 2021

(30) Foreign Application Priority Data

Aug. 6, 2020 (CN) .......................... 202010784646.9

(51) Int. Cl.
*G01V 1/28* (2006.01)
*G01V 1/36* (2006.01)

(52) U.S. Cl.
CPC .............. *G01V 1/282* (2013.01); *G01V 1/364* (2013.01); *G01V 2210/32* (2013.01); *G01V 2210/665* (2013.01)

(58) Field of Classification Search
None
See application file for complete search history.

(56) References Cited

U.S. PATENT DOCUMENTS 10,510,021 B1* 12/2019 Kale ...................... G06N 5/003
10,861,143 B2* 12/2020 Kim ..................... G06N 3/0454
(Continued)

FOREIGN PATENT DOCUMENTS

CN 107356963 A 11/2017
CN 107783183 A 3/2018
(Continued)

OTHER PUBLICATIONS

Ding Yan et al.,"Fracture prediction based on deep learning: Application to a buried hill carbonate reservoir in the S area", Geophysical Prospecting for Petroleum, 2020, 59(2): 267-275.

*Primary Examiner* — Lina M Cordero
(74) *Attorney, Agent, or Firm* — Bayramoglu Law Offices LLC

(57) ABSTRACT

A model-driven deep learning-based seismic super-resolution inversion method includes the following steps: 1) mapping each iteration of a model-driven alternating direction method of multipliers (ADMM) into each layer of a deep network, and learning proximal operators by using a data-driven method to complete the construction of a deep network ADMM-SRINet; 2) obtaining label data used to train the deep network ADMM-SRINet; 3) training the deep network ADMM-SRINet by using the obtained label data; and 4) inverting test data by using the deep network ADMM-SRINet trained at step 3). The method combines the advantages of a model-driven optimization method and a data-driven deep learning method, and therefore the network has the interpretability; and meanwhile, due to the addition of physical knowledge, the iterative deep learning method lowers requirements for a training set, and therefore an inversion result is more reliable.

10 Claims, 11 Drawing Sheets

(56) References Cited

U.S. PATENT DOCUMENTS

| | | | | |
|---|---|---|---|---|
| 2015/0086131 | A1* | 3/2015 | Wang | .................. G06T 5/003 |
| | | | | 382/275 |
| 2018/0165554 | A1* | 6/2018 | Zhang | .................. G06K 9/6256 |
| 2020/0302249 | A1* | 9/2020 | Liu | .................. G06T 7/97 |
| 2021/0319534 | A1* | 10/2021 | Liu | .................. G06T 5/003 |

FOREIGN PATENT DOCUMENTS

| | | | |
|---|---|---|---|
| CN | 110082821 A | 8/2019 | |
| WO | 2020123101 A1 | 6/2020 | |
| WO | WO-2020157754 A1 * | 8/2020 | ............... G06T 9/00 |

\* cited by examiner

MODEL-DRIVEN DEEP LEARNING-BASED SEISMIC SUPER-RESOLUTION INVERSION METHOD

CROSS REFERENCE TO THE RELATED APPLICATIONS

This application is based upon and claims priority to Chinese Patent Application No. 202010784646.9, filed on Aug. 6, 2020, the entire contents of which are incorporated herein by reference.

TECHNICAL FIELD

The present disclosure relates to the field of signal processing in geophysical exploration, and relates to a super-resolution inversion method for seismic data, particularly to a model-driven deep learning-based seismic super-resolution inversion method.

BACKGROUND

In seismic exploration, as research targets become more and more complex, higher exploration accuracy requirements have been raised for the clear description of a geological structure, a lithological change, a fluid property and other characteristics. In recent years, breakthroughs have been made in seismic acquisition technology, which lays the foundation for obtaining a super-resolution (also called high-resolution) seismic section, but some processing technologies are still needed to achieve a higher resolution. To improve a vertical resolution of seismic data, people have developed several technologies, such as full-band or band-limited deconvolution and inverse Q filtering. All these methods can be implemented through inversion frameworks, and therefore these inversion-based methods may be collectively referred to as seismic super-resolution inversions. According to Candès' research, an objective of the super-resolution inversion is to extract fine-scale details from coarse-scale information of a signal, that is, the objective of the super-resolution inversion is to obtain an optimal super-resolution signal by minimizing a given loss function.

However, due to the presence of band-limited seismic wavelets and noise, super-resolution inversion problems are normally ill-posed. The most common solution is to use a regularization method. Generally, an objective function in the regularization method is used to measure a difference between observed data and inverted data by creating one loss function, and then a certain penalty term is added to enable the problems to become well-posed. By optimizing the objective function, the seismic super-resolution inversion can be implemented. So far, researchers have specifically proposed various solutions for determining a constraint function and a regularization parameter. For a constraint term, a sparse constraint is the most commonly used solution, which is composed of two parts, i.e. a transformation function and a regularization function, and therefore many researchers implement the sparsest expression of an inverted variable by determining the two parts. For example, Yuan, et al. implemented an impedance inversion by adding an L1 norm constraint in an F-K transform domain of spatial information; Hao, et al. proposed a transform domain sparse regularization solution based on wavelet transform constraint, curvelet transform constraint, and dual constraints to implement inverse Q filtering; and Gholami, et al. proposed a sparse deconvolution method in which a mixed Lp-L1 measure was designed for a loss term and a regularization term of data. The regularization parameter in the optimization algorithm controls a weight between a loss term and a constraint term, and plays an important role in an inversion result. If a too large or too small regularization parameter is selected, an inversion result will become over-sparse or under-sparse. At present, there are some commonly used methods for determining an adaptive parameter, such as a generalized cross validation (GCV) method, an L-curve method and its variations. Although these methods are effective in determining the parameter, they will increase the calculation time, and especially in the case of multiple parameter coupling, they have a certain application limitation. Therefore, most researchers obtain the parameter through experience.

The above regularization method is a model-drive optimization method. Although the model-driven method is ensured by many theories, it is still a challenging task to determine unknown terms such as a constraint function and a regularization parameter. In recent years, based on the inspiration of deep neural networks, a mapping function between observed data and a model parameter may be directly learned from a training data set, which has a great potential in overcoming the limitation of the model-driven method. At present, deep learning methods have been widely applied in the field of images, and relevant articles are exponentially increased. In addition to the field of images, the deep learning is also applied to seismic data processing. For example, Zhang, et al. trained a deep neural network to estimate distribution of underground phase that is used as a physical constraint in a conventional elastic full waveform inversion method; Lu, et al. proposed a method for replacing a seismic trace interpolation with generative adversarial networks (GANs), which may promote automatic seismic interpretation workflow; and Peters, et al. discussed a relationship between a deep network and other geophysical inversion problems, and gave some actual application cases.

In the seismic data processing, a basic idea of the existing data-driven deep learning method is to use a conventional network system structure to directly learn feedforward mapping without the driving of physical knowledge. The method may greatly reduce the time complexity. However, the conventional network structure is normally known as a "black box" that lacks of the interpretability and heavily depends on a large number of data sets (Xu, et al.). Tight oil and gas reservoirs are main oil and gas resources at present and for a very long time in future, and one of the core technologies for exploration and development of this kind of oil and gas reservoir is seismic super-resolution inversion. Due to the complexity of the earth's surface, a low signal to noise ratio of seismic data, etc., a current inversion resolution and the fidelity cannot meet the actual requirements of oil and gas exploration and development. Therefore, it is urgent to develop a novel method to break through the limitations of the conventional methods, and provide a core technology for exploration and development of this kind of oil and gas reservoir.

SUMMARY

In order to overcome the above defects in the prior art, an objective of the present disclosure is to provide a model-driven deep learning-based seismic super-resolution inversion method which combines advantages of a model-driven optimization method and a data-driven deep learning method, and therefore a network structure has the interpretability; meanwhile, due to the addition of physical knowledge, the iterative deep learning method lowers requirements for a training set and makes an inversion result more credible.

To achieve the object above, the present discloses the technical solutions as below.

The present disclosure discloses a model-driven deep learning-based seismic super-resolution inversion method, comprising the following steps:

1) mapping each iteration of a model-driven alternating direction method of multipliers (ADMM) to each layer of a deep network, and learning proximal operators by using a data-driven method to complete construction of a deep network ADMM-SRINet;
2) obtaining label data used to train the deep network ADMM-SRINet;
3) training the deep network ADMM-SRINet by using the obtained label data; and
4) inverting test data by using the deep network ADMM-SRINet trained at step 3).

Preferably, at step 1), a proximal form of the alternating direction method of multipliers (ADMM) is shown as the following formula (1):

$$\begin{cases} r^k = prox_{\rho f}(x^{k-1} - \beta^{k-1}), \\ x^k = prox_{\rho g}(r^k + \beta^{k-1}), \\ \beta^k = \beta^{k-1} + \eta^k(r^k - x^k), \end{cases} \quad (1)$$

wherein $r^k$ and $x^k$ in formula (1) are respectively learned by using a residual convolutional network block, for a third part $\beta^k$ in formula (1), only one parameter $\eta$ needs to determine in each iteration; and each iteration process in formula (1) is unrolled to construct the deep network.

Further preferably, at step 1), the constructed deep network ADMM-SRINet comprises three stages, in the kth stage, the network is composed of three modules, i.e. a module $r^k$, a module $x^k$, and a module $\beta^k$, the modules $r^k$ and $x^k$ are configured to calculate values of $r^k$ and $x^k$ by using a learning operator; the module $\beta^k$ is configured to calculate a value of $\beta^k$, and nodes of the three module are connected via straight lines with the directionality.

Further preferably, the first learning operator in formula (1) is as follow:

$$r^k = \Gamma_{\Theta_k^f}(r^{k-1}, x^{k-1}, \beta_{k-1}, W^T W r_{k-1}, y), \quad (2)$$

where $\Gamma_{\Theta_k^f}$ represents a learning operator in the kth iteration, a parameter set in the learning operator is represented by $\Theta_k^f$; $r^{k-1}$, $x^{k-1}$, $\beta^{k-1}$, $W^T W r^{k-1}$, and y are input of the learning operator $\Gamma_{\Theta_k^f}$, the learning operator is learned by one residual convolutional network block that is composed of two "Conv+ReLu" layers and one "Conv" layer, wherein "Conv" represents a convolution operator, and "ReLu" represents a linear rectification activation function;

in the residual convolutional network, there are 32 convolution kernels with a size of 3×1 on each layer, and there is only one convolution kernel with a size of 3×1×32 on the last layer; input of the network comprises physical knowledge in a forward model and gradient information of a loss function in the model-driven method.

Further preferably, the second learning operator in formula (1) is used to learn a mapping relationship $\gamma_{\Theta_k^g}$ between $x^k$ and $p^k$, that is:

$$x^k = \Upsilon_{\Theta_k^g}(p^k), \quad (3)$$

where $\Theta_k^g$ represents the network parameters in the kth iteration of the network, the second learning operator is learned by using three residual convolutional network blocks, wherein a structure of each residual convolutional network block is the same as that of the network used to learn the first learning operator.

Further preferably, for the third part in formula (1), only one parameter $\eta$ needs to determine in each iteration, $\eta$ is considered as a weight in the network, and is learned together with other parameters in the network from training data.

Preferably, at step 2), the label data comprises model data and field data, wherein:

for the model data, a known velocity model is used to perform forward modeling to obtain seismic super-resolution data that is used as the label data; and for the field data, an acquisition procedure is as follows: seismic data is first subjected to denoising preprocessing and then subjected to non-stationary correction to obtain stationary seismic data; a reflection coefficient is obtained by using the alternating iterative inversion method, and the reflection coefficient is reflected through a wide-band Gaussian or Yu wavelet to obtain band-limited super-resolution data that is used as the label data.

Further preferably, step 3) of training the network ADMM-SRINet by using the obtained label data specifically comprises the following steps:

first preliminarily training the network by using the model data to enable parameters in the network to have an initial value; then specifically obtaining field label data for the field data in different target areas, and performing fine adjustment on the network by a transfer learning strategy by suing the field label data, and finally the network is used to invert corresponding field data.

Further preferably, during the training of the deep network ADMM-SRINet, a loss function is as follow:

$$E(\Theta) = \frac{1}{N} \sum_{i=1}^{N} \|\hat{r}_i - r_i^{gt}\|_2^2, \quad (4)$$

wherein a network parameter is $\Theta = \{\Theta_k^g, \Theta_k^f, \eta^k\}_{k=1}^{N_t}$, N represents the number of training data pairs, $\hat{r}_i$ is output of the network corresponding to the ith training data pair, and $r_i^{gt}$ is a genuine solution corresponding to $\hat{r}_i$.

Further preferably, in formula (4), optimization is performed by a small batch stochastic gradient descent (SGD) method, and a fixed number of iterations is set as a stop condition for the iterations.

In the present disclosure, an initial value of a convolution kernel in a network is set as a random number, the number of each batch is 10, $r^0$ is set as a least squares solution, and $x^0$ and $\beta^0$ are set as zero. Because TensorFlow can automatically calculate a gradient and optimize a parameter, all source codes are implemented through TensorFlow.

Compared with the prior art, the present disclosure has the following beneficial effects:

the method disclosed by the present disclosure fully combines advantages of a model-driven optimization algorithm and a data-driven deep learning method, and can quickly and efficiently implement a seismic super-resolution inversion. First, each iteration of an iterative algorithm alternating direction method of multipliers (ADMM) is mapped to each layer of a deep network, proximal operators are learned by using a residual convolutional network to complete construction of a deep network ADMM-SRINet that may avoid a matrix calculation and the design of regularization terms to implement an artificial intelligent seismic super-resolution inversion. Second, in order to train the deep network ADMM-SRINet, the acquisition of label data is very important, according to the present disclosure, the label data may be obtained from model data and field data, and tests prove that the present disclosure may obtain a reliable inversion result; and then the deep network ADMM-SRINet is trained by using the obtained data, and test data is inverted by using the trained deep network ADMM-SRINet to complete the overall inversion process. The deep network of the present disclosure is configured to invert synthetic and field data, which verifies the effectiveness of the present disclosure, and the method fully combines the advantages of the model-driven alternating direction method of multipliers (ADMM) and the data-driven deep learning method, and may avoid the design of regularization terms and implement a fast calculation of high-dimensional data.

Further, based on the inspiration of a strong learning capacity of the deep learning, the present disclosure replaces the proximal operators with learning operators whose parameters are obtained through training. Therefore, a relatively optimal solution may be obtained for the proximal problems under a relatively small number of iterations, which avoids the determination of some parameters. Although there is no explicit expression for learning the proximal operator, a universal approximation property of a neural network ensures that theses operators may be arbitrarily approximated.

Further, the label data used to train the deep network ADMM-SRINet may be obtained from the model data and the field data. The model data may be forward modeled by using a known velocity model to obtain seismic super-resolution data. For the field data, due to the complexity of the field data, in order to obtain reliable label data, the seismic data is first subjected to preprocessing such as denoising and then subjected to non-stationary correction; and according to the present disclosure, a non-stationary correction method is used to obtain relatively good stationary seismic data, and then an alternating iterative inversion method is used to invert a reflection coefficient and a seismic wavelet. The obtained seismic reflection coefficient may be used as a label of the seismic data. However, in practice, due to the limited inversion performance of the deep network and the complexity of the field data, it is difficult to accurately invert a full-band reflection coefficient. Therefore, in the present disclosure, in order to invert relatively reliable super-resolution data, a wide-band Gaussian or Yu wavelet is used to reflect the reflection coefficient so as to obtain band-limited super-resolution data which is used as the label data.

Further, the deep network ADMM-SRINet is trained by using the obtained label data, during the training, the present disclosure uses a thought of transfer learning, and first the network is preliminarily trained by using the model data, and therefore parameters in the network have a relatively good initial value. Then field data labels are specifically obtained for field data in different target areas. Because the network has relatively good initial values, a requirement for the number of labels of the field data is very low. The network may be configured to invert corresponding field data after being finely adjusted by using the field label data.

Much further, there will be a loss during the network training, and the loss can be optimized by a small batch stochastic gradient descent (SGD) method. For ease of the optimization, a fixed number of iterations is set as a stop condition for the iterations. In addition, an initial value of a convolution kernel in a network is set as a random number, the number of each batch is 10, $r^0$ is set as a least squares solution, and $x^0$ and $\beta^0$ are set as zero. Because TensorFlow can automatically calculate a gradient and optimize a parameter, all source codes are implemented through TensorFlow.

BRIEF DESCRIPTION OF THE DRAWINGS

FIG. 4A to FIG. 4B show a wavelet and its corresponding amplitude spectrum thereof in a model example; wherein FIG. 4A shows a Ricker wavelet and a Yu wavelet in a time domain, and FIG. 4B shows amplitude spectra of the Ricker wavelet and the Yu wavelet;

FIG. 7A to FIG. 7C show an inversion result display 1 of a test data set, data at a dotted line position being assumed to be well-logging data; wherein FIG. 7A shows observed data, FIG. 7B shows a genuine solution of a super-resolution inversion, and FIG. 7C shows an inversion result of the present disclosure;

FIG. 8A to FIG. 8C show an inversion result display 2 of a test data set, data at a dotted line position being assumed to be well-logging data; wherein FIG. 8A shows observed data, FIG. 8B shows a genuine solution of a super-resolution inversion, and FIG. 8C shows an inversion result of the present disclosure;

FIG. 9A to FIG. 9E show an inversion result display of model single trace data; wherein FIG. 9A to FIG. 9E are respectively correspond to the data at the dotted line position in FIG. 7A to FIG. 7C and FIG. 8A to FIG. 8C, a gray solid line represents observed data, a black dotted line represents a genuine solution of an inversion, and a gray dotted line represents an inversion result;

FIG. 11A to FIG. 11B show a wide-band Gaussian wavelet used to invert field data; wherein FIG. 11A shows the wide-band Gaussian wavelet, and FIG. 11B shows an amplitude spectrum of the wide-band Gaussian wavelet;

FIG. 12A to FIG. 12C show an inversion result display of field data; wherein FIG. 12A shows field observed data, FIG. 12B shows an inversion result obtained by a model-trained network, and FIG. 12C shows an inversion result obtain by a finely adjusted network; and FIG. 13A to FIG. 13C show an amplitude spectrum display of an inversion result of field data; wherein FIG. 13A shows an amplitude spectrum of the data in FIG. 12A, FIG. 13B shows an amplitude spectrum of the data in FIG. 12B, and FIG. 13C shows an amplitude spectrum of the data in FIG. 12C.

DETAILED DESCRIPTION OF THE EMBODIMENTS

Figure 1:
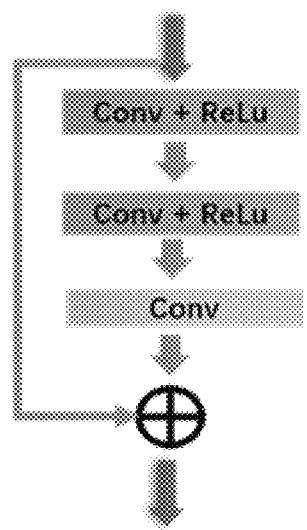
FIG. 1 shows a residual convolutional network structure used to learn an operator $\Gamma_{\Theta_k^f}$.

In order to enable those skilled in the art to better understand solutions of the present disclosure, the technical solutions in embodiments of the present disclosure will be clearly and completely described below in conjunction with the drawings in the embodiments of the present disclosure. Apparently, the described embodiments are only some embodiments but not all embodiments of the present disclosure. All other embodiments obtained by those of ordinary skill in the art based on the embodiments of the present disclosure without creative work shall fall within the scope of protection of the present disclosure.

It should be noted that the terms "first", "second", and the like in the description, claims and drawings of the present disclosure are used to distinguish similar objects, and are not necessarily used to describe a specific sequence or order. It should be understood that data used in this way may be interchanged under appropriate conditions so that the embodiments of the present disclosure described here can be implemented in a sequence other than those illustrated or described here. In addition, the terms "include" and "have" and any variation thereof are intended to cover non-exclusive inclusions. For example, a process, method, system, product, or device that includes a series of steps or units is not necessarily limited to those steps and units clearly listed, but may include other steps or units that are not clearly listed or are inherent to these processes, methods, products, or devices.

The present disclosure will be further described below in detail with reference to the drawings.

The present disclosure proposes a model-driven deep learning method to implement a seismic super-resolution inversion, which is called ADMM-SRINet. The method combines a model-driven alternating direction method of multipliers (ADMM) with a data-driven deep learning method to construct a deep network structure. Specifically, according to the method, each iteration of ADMM is mapped to each layer of a network, and proximal operators are learned by using the data-driven method. All parameters such as a regularization parameter and a transformation matrix in the network may be implicitly learned from a training data set, and are not limited to a form of regularization term. In addition, for complex field data, the present disclosure designs a set of processes for obtaining label data and a novel solution for network training, so ADMM-SRINet may be used to better invert the field data. Finally, the network is configured to invert synthetic and field data, which verifies the effectiveness of the present disclosure.

1. ADMM-Based Seismic Super-Resolution Inversion

Based on a conventional convolution model, seismic records may be modeled by using the following mathematical framework:

$$y = Wr, \quad (1)$$

$y \in R^n$ represents observed data, $W \in R^{n \times m}$ is a convolution matrix composed of seismic wavelets, and $r \in R^m$ is a super-resolution result to be solved. A main objective of the seismic super-resolution inversion is to optimize an objective function in the following formula:

$$\hat{r} = \operatorname{argmin}_r \frac{1}{2}\|y - Wr\|_2^2 + \lambda\|Dr\|_p, \quad (2)$$

D represents a sparse transformation matrix, $\lambda$ is a regularization parameter, and $\|\cdot\|_p$ represents a norm of $l_p (0 \le p \le 1)$. In order to solve formula (2), various iterative optimization algorithms such as an alternating direction method of multipliers (ADMM) and an iterative shrinkage threshold algorithm (ISTA) have been proposed. In the present disclosure, ADMM is adopted.

ADMM is also known as a Douglas-Rachford splitting algorithm that may be used to split an objective function into multiple sub-problems and then perform alternating solution. ADMM may be interpreted by using a thought of augmented Lagrangian. First an auxiliary variable x is introduced, and formula (2) may be written as the following form:

$$\min_r \frac{1}{2}\|y - Wr\|_2^2 + \lambda\|Dx\|_p \quad \text{s.t.} x = r, \quad (3)$$

An augmented Lagrangian form of formula (3) is as follow:

$$L_\rho(r, x, \alpha) = \frac{1}{2}\|y - Wr\|_2^2 + \lambda\|Dx\|_p + \alpha^T(r - x) + \frac{\rho}{2}\|r - x\|_2^2, \quad (4)$$

where $\rho$ is a penalty parameter, and $\alpha$ is a dual variable. Based on three variables in formula (4), formula (4) is split into the following three sub-problems:

$$\begin{cases} \operatorname{argmin}_r \frac{1}{2}\|y - Wr\|_2^2 + \frac{\rho}{2}\|r + \beta - x\|_2^2, \\ \operatorname{argmin}_x \frac{\rho}{2}\|r + \beta - x\|_2^2 + \lambda\|Dx\|_p, \\ \beta \leftarrow \beta + \eta(r - x), \end{cases} \quad (5)$$

where $$\beta = \frac{\alpha}{\rho},$$

and $\eta$ is an updated parameter. A first formula and a third formula in formula (5) are easy to solve, but a solution of a second formula is challenging, specially under a condition that the regularization term is nonconvex, it is difficult for researchers who are not engaged in algorithm optimization to solve the non-convex problem. Generally, when $\|Dx\|_p = \|Dx\|_1$ and D is an orthogonal matrix, a solution of each sub-problem in formula (5) is as follow:

$$\begin{cases} r^k = (W^T W + \rho I)^{-1}(W^T y + \rho(x^{k-1} - \beta^{k-1})), \\ x^k = D^T S_{\lambda/\rho}\{D(r^k + \beta^{k-1})\}, \\ \beta^k = \beta^{k-1} + \eta(r^k - x^k), \end{cases} \quad (6)$$

where $S_{\lambda/\rho}$ is a soft threshold function with a threshold of $\lambda/\rho$. Other threshold functions may be selected to replace the soft threshold function.

ADMM described above is a model-driven method, where the regularization term $\lambda$, the parameter $\rho$, the sparse matrix D, and some other hyper-parameters in ADMM need to be determined in advance. In addition, ADMM needs to be subjected to multiple iterations to achieve a satisfied result, which brings a big challenge to an inversion of high-dimensional data. Moreover, the non-orthogonal matrix D and $0 \le p < 1$ make formula (5) difficult to be solved.

2. Model-Driven ADMM-SRINet

In order to solve the limitation of ADMM, a model-driven deep network is designed to implement a seismic super-resolution inversion, which is called ADMM-SRINet. In order to introduce the proposed network structure, formula (5) is written as the following proximal form:

$$\begin{cases} r^k = prox_{\rho f}(x^{k-1} - \beta^{k-1}), \\ x^k = prox_{\rho g}(r^k + \beta^{k-1}), \\ \beta^k = \beta^{k-1} + \eta^k(r^k - x^k), \end{cases} \quad (7)$$

where $\eta$ is a parameter varying with the number of iterations, and $prox_{\rho f}(\cdot)$ and $prox_{\rho g}(\cdot)$ are proximal operators and are defined as follow:

$$prox_{\rho f}(z) = \underset{\hat{z}}{\mathrm{argmin}} f(\hat{z}) + \frac{\rho}{2}\|\hat{z} - z\|_2^2, \quad (8)$$

and $$prox_{\rho g}(z) = \underset{\hat{z}}{\mathrm{argmin}} g(\hat{z}) + \frac{\rho}{2}\|\hat{z} - z\|_2^2, \quad (9)$$

For an input variable $\hat{z}$, $$f(\hat{z}) = \frac{1}{2}\|y - W\hat{z}\|_2^2$$

and $g(\hat{z}) = \lambda \|D\hat{z}\|_p$. By observing formula (7), it can be seen that the proximal operators $prox_{\rho f}(\cdot)$ and $prox_{\rho g}(\cdot)$ are the keys to solve the inverse problems and may be replaced with other operators such as a denoising operator. In the present disclosure, based on the inspiration of the strong learning capacity of the deep learning, a learning operator is used to replace the proximal operator according to Adler's work in 2018, wherein parameters in the learning operator may be obtained through training. Therefore, a relatively optimal solution may be obtained for the proximal problem under a relatively small number of iterations, which avoids the determination of some parameters. Although there is no explicit expression for learning the proximal operator, a universal approximation property of a neural network ensures that these operators may be arbitrarily approximated. The following is a detailed description of ADMM-SRINet.

A. First Learning Operator

Although there is an analytical solution for the first proximal problem in formula (7), the calculation of the matrix increases the calculation cost, and the selection of the parameters increases the difficulty of solution. Therefore, different form Yang's work in 2018, one residual convolutional network block is used to replace the first proximal operator $prox_{\rho f}(\cdot)$ so as to learn a mapping relationship between $r^k$ and $(x^{k-1} - \beta^{k-1})$, which is expressed by the following formula:

$$r_k = \Gamma_{\Theta_k^f}(r^{k-1}, x^{k-1}, \beta^{k-1}, W^T W r^{k-1}, y), \quad (10)$$

where $\Gamma_{\Theta_k^f}$ represents a learning operator in a kth iteration, and a parameter in the learning operator is represented by $\Theta_k^f$. $r^{k-1}$, $x^{k-1}$, $\beta^{k-1}$, $W^T W r^{k-1}$, and y are input of the learning operator $\Gamma_{\Theta_k^f}$. FIG. 1 shows a residual convolutional block used to learn the operator $\Gamma_{\Theta_k^f}$, the network block is composed of two "Conv+ReLu" layers and one "Conv" layer, wherein "Conv" represents a convolution operator, and "ReLu" represents a linear rectification activation function. In the residual convolutional block, there are 32 convolution kernels with a size of 3×1 on each layer, and there is only one convolution kernel with a size of 3×1×32 on the last layer. A dark gray arrow represents input and output of the network, and a light gray arrow represents a processing relationship between different network layers. It should be noted that the input of the network includes physical knowledge in the forward model and gradient information of the loss function in the model-driven method.

B. Second Learning Operator

The second proximal problem in formula (7) is usually non-convex, and it is difficult to select an appropriate normal form to obtain an optimal result, and therefore it is a novel way to solve the limitation of the conventional method by using the currently rapidly developed deep learning method. In order to design a network structure to learn the proximal operator $prox_{\rho g}(\cdot)$, the second formula in formula (5) is rewritten as the following form:

$$x^k = \underset{x}{\mathrm{argmin}} \frac{\rho}{2}\|p^k - x\|_2^2 + \lambda\|F(x)\|_p, \quad (11)$$

where $p^k = r^k + \beta^{k-1}$, and F represents a nonlinear sparse function. Based on theorem 1 in the work of Zhang, et al. in 2018, the following approximation expression may be obtained:

$$\|F(x) - F(p^k)\|_2^2 \approx \upsilon \|x - p^k\|_2^2, \quad (12)$$

where $p^k$ and $F(p^k)$ are assumed to be mean values of x and F(x). Therefore, formula (11) may be rewritten as follow:

$$x^k = \underset{x}{\mathrm{argmin}} \frac{\rho}{2}\|F(p)^k - F(x)\|_2^2 + \varsigma\|F(x)\|_p = prox_{\varsigma g'}(F(p^k)), \quad (13)$$

where $g'(\cdot) = \varsigma\|F(\cdot)\|_p$, and $\varsigma = \upsilon\lambda$. By using the residual convolutional network block, a solution of formula (13) may be obtained through one learning operator, which is expressed as follow:

$$F(x^k) = \Lambda_{\Theta_k^{g'}}(F(p^k)), \quad (14)$$

where $\Lambda_{\Theta_k^{g'}}$ is a learning operator used to replace the proximal operator. Formula (14) is an inverse problem solution in a sparse domain. Assuming that the transformation function F has an inverse transformation function, a solution of formula (13) is as follow:

$$x^k = F^{H^k}\Lambda_{\Theta_k^{g'}}(F^k(p^k)), \quad (15)$$

where similarly the learning operator is used to transform function F and its inverse function, and $F^k$ and $F^{H^k}$ are used to represent learning operators in the kth iteration. If an enhanced version is considered, $x^k$ may be updated through the following formula:

$$x^k = p^k + Q^k(F^{H^k}\Lambda_{\Theta_k^{g'}}(F^k(J^k(p^k)))), \quad (16)$$

where a learning operator $R^k = Q^k \circ J^k$ is used to extract a lost high frequency component from $x^k$, that is, $w^k = R^k(x^k)$, so under a noiseless condition, $x^k = p^k + w^k$.

By observing formula (16), it can be seen that if operators $Q^k F^{H^k}$ and $F^k J^k$ are learned by using the same network structure, the second term in the formula has the symmetry. Therefore, the operators $Q^k F^{H^k}$, $F^k J^k$, and $\Lambda_{\Theta_k^{g'}}$ in formula (16) may be learned by using three residual convolutional blocks, wherein each residual convolutional block has the same structure as the network in FIG. 1, and there is a large skip connection between input and output. In addition, a first residual convolutional block shares parameters with a third residual convolutional block, which not only reduces the number of parameters in the network, but also reflects the symmetry of the network. It is worthwhile to note that the form of formula (16) only provides one thought for constructing the network, but each part in the network not strictly corresponds to each operator in formula (16). Similarly, other more effective network structures may be designed to implement formula (16).

Figure 2:
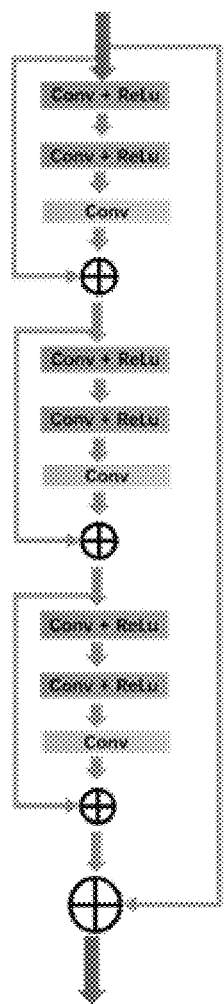
FIG. 2 shows a residual convolutional network structure used to learn an operator $\gamma_{\Theta_k^g}$.

Based on the above derivation, FIG. 2 shows three designed residual convolutional blocks. A main objective of the network is to learn a mapping relationship $\gamma_{\Theta_k^g}$ between $x^k$ and $p^k$, that is:

$$x_k = \gamma_{\Theta_k^g}(p^k), \quad (17)$$

where $\Theta_k^g$ represents a network parameter in the kth iteration of the network.

C. Network Structure of ADMM-SIRNet

Figure 3:
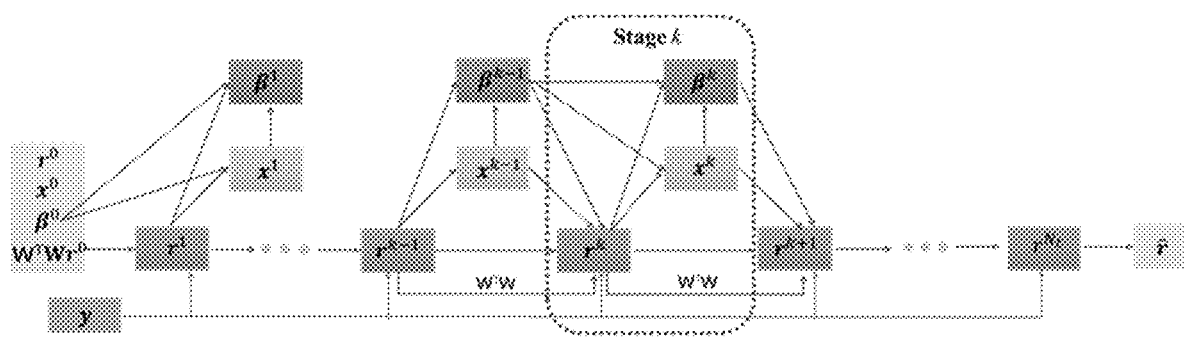
FIG. 3 shows a complete deep network ADMM-SRINet structure.

Based on the above descriptions of A and B, it can be seen that the proximal operator in formula (7) may be replaced with a residual convolutional network. For the third part in formula (7), only one parameter $\eta$ needs to determine in each iteration. $\eta$ may be considered as a weight in the network, which is learned together with other parameters in the network from training data. Finally, a complete network structure of ADMM-SRINet is shown in FIG. 3. In the network, an iteration parameter is set as 3, and in order to distinguish it from the number of iterations used in a minimizing loss function during the training, each iteration of the network structure is named as a stage, that is, a structure in each stage approximately corresponds to each iteration process in the iterative optimization algorithm ADMM. In a kth stage, the network is composed of three modules, i.e. a module $r^k$, a module $x^k$, and a module $\beta^k$. The modules $r^k$ and $x^k$ are configured to calculate values of $r^k$ and $x^k$ by using a learning operator. The module $\beta^k$ is configured to calculate a value of $\beta^k$. Nodes of the three modules are connected via straight lines with directionality, which illustrate a relationship between the nodes. Finally, observed data, model information, and some initial values are given, and then the network ADMM-SRINet may be used to implement a seismic super-resolution inversion.

D. Network Optimization of ADMM-SRINet

In order to obtain all parameters in ADMM-SRINet, the following function is minimized:

$$E(\Theta) = \frac{1}{N} \sum_{i=1}^{N} \|\hat{r}_i - r_i^{gt}\|_2^2, \quad (18)$$

where a network parameter is $\Theta = \{\Theta_k^g, \Theta_k^f, \eta^k\}_{k=1}^{N_t}$, N represents the number of training data pairs, $\hat{r}_i$ is output of the network corresponding to a ith training data pair, and $r_i^{gt}$ is a genuine solution corresponding to $\hat{r}_i$. Formula (18) can be optimized by a small batch stochastic gradient descent (SGD) method. For ease of the optimization, a fixed number of iterations is set as a stop condition for the iterations. In addition, an initial value of a convolution kernel in the network is set as a random number, the number of each batch is 10, $r^0$ is set as a least squares solution, and $x^0$ and $\beta^0$ are set as zero. Because TensorFlow can automatically calculate a gradient and optimize a parameter, all source codes are implemented through TensorFlow.

A material basis of the present disclosure is a seismic data volume, and a trace-by-trace processing method is used. Specific steps may refer to a process framework in FIG. 10, and includes the following steps:

step 1: each iteration of a model-driven alternating direction method of multipliers (ADMM) is mapped to each layer of a deep network, and proximal operators are learned by using a data-driven method to complete construction of a deep network ADMM-SRINet (see FIG. 3);

step 2: label data used to train the deep network ADMM-SRINet is obtained;

step 3: the deep network ADMM-SRINet is trained by using the obtained label data; and step 4: test data is inverted by using the deep network ADMM-SRINet trained at step 3).

Effectiveness Analysis:

1. Synthetic Data Example

Figure 4A:
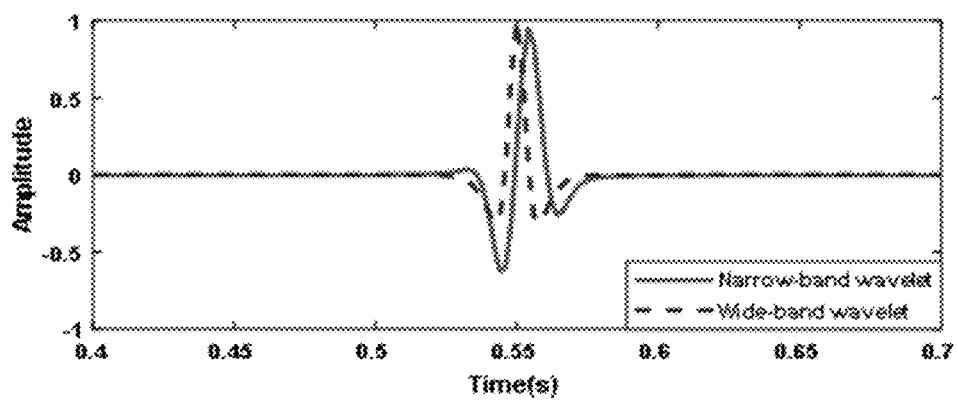
Figure 4B:
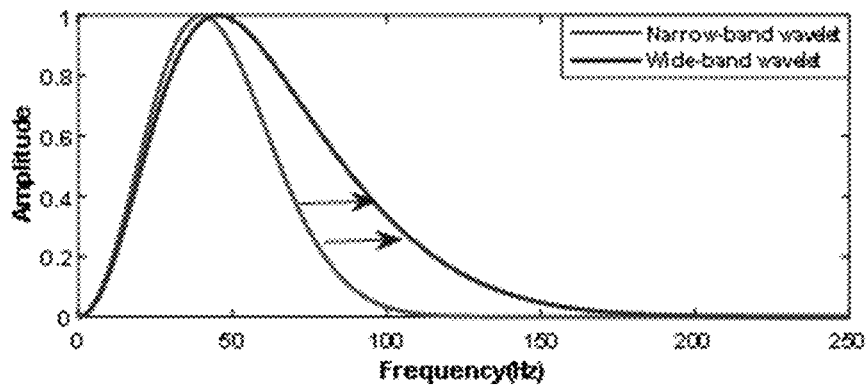
Figure 5:
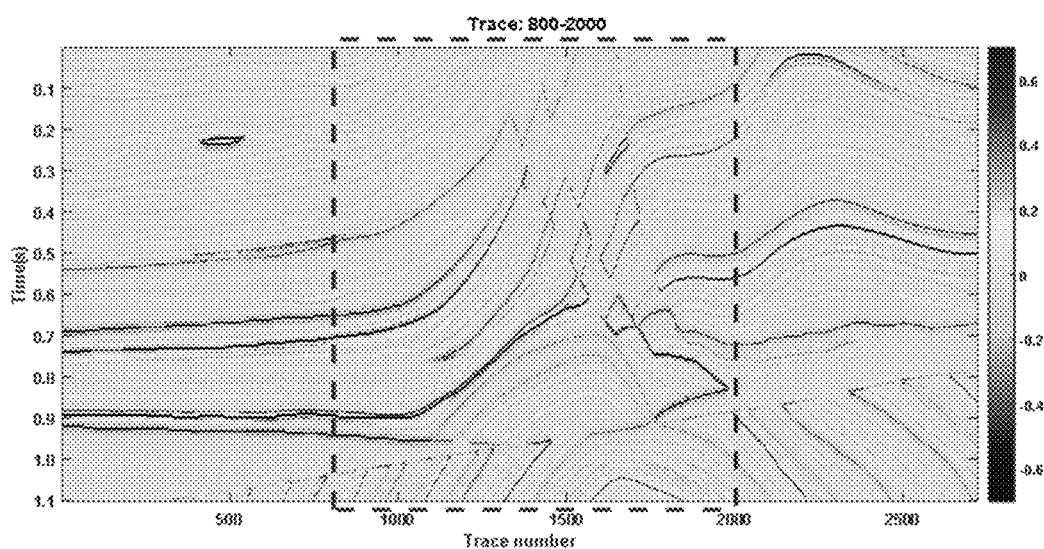
FIG. 5 shows band-limited super-resolution data, wherein data in a dotted block is used to generate a training data set, and other data is used to generate a test data set.
Figure 6:
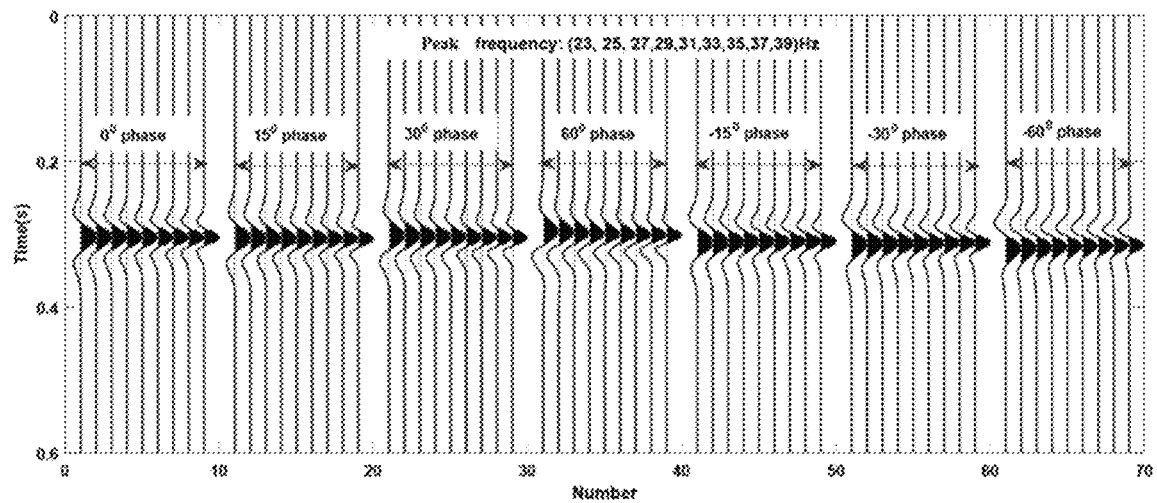
FIG. 6 shows a wavelet library used to generate a training data set, wherein wavelets in the wavelet library have different peak frequencies and rotation phases.

Due to a relatively low signal to noise ratio of field seismic data, it is usually difficult to recover an underground full-band reflection coefficient. In contrast, an inversion result of a band-limited reflection coefficient is more reliable. Therefore, in the present disclosure, the super-resolution inversion method is mainly used to invert a band-limited reflection coefficient from seismic data. First, in order to train the proposed network ADMM-SRINet, a Marmousi II velocity model was used to generate a reflection coefficient profile, and then the reflection coefficient module was convoluted with a Yu wavelet (a dotted line in FIG. 4A) to obtain required band-limited super-resolution data. FIG. 5 shows the band-limited super-resolution data, wherein data in a dotted block is used to generate a training data set, and other data is used to generate a test data set. In addition, a Ricker wavelet library with different peak frequencies and phases was designed for generating training data, as shown in FIG. 6. The design of the wavelet library may be understood as one data augmentation manner, which may not only increase the number of the training data sets, but also enhance the generalization of the network. It should be noted that in each training of the network, input of the network was generated by convoluting any wavelet in the wavelet library with any super-resolution data, that is, the training data was generated. Finally, the network was trained by using input data and label data.

Figure 7A:
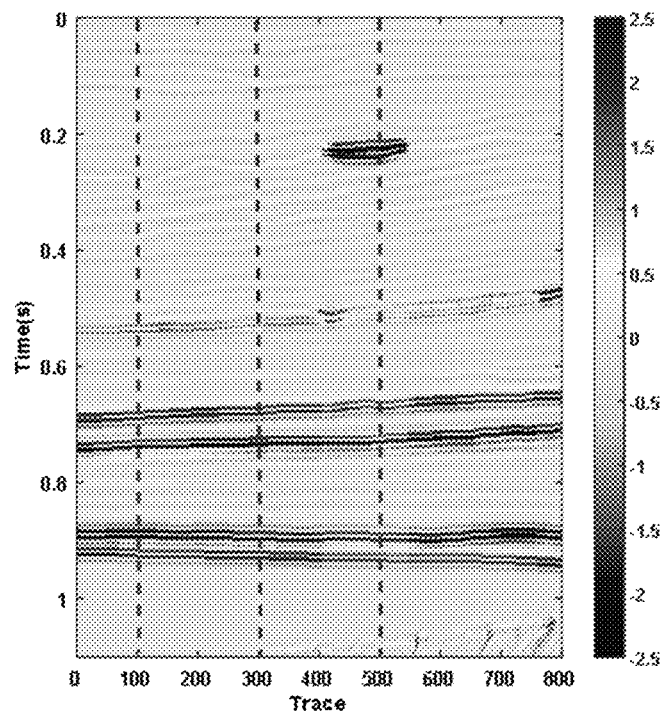
Figure 7B:
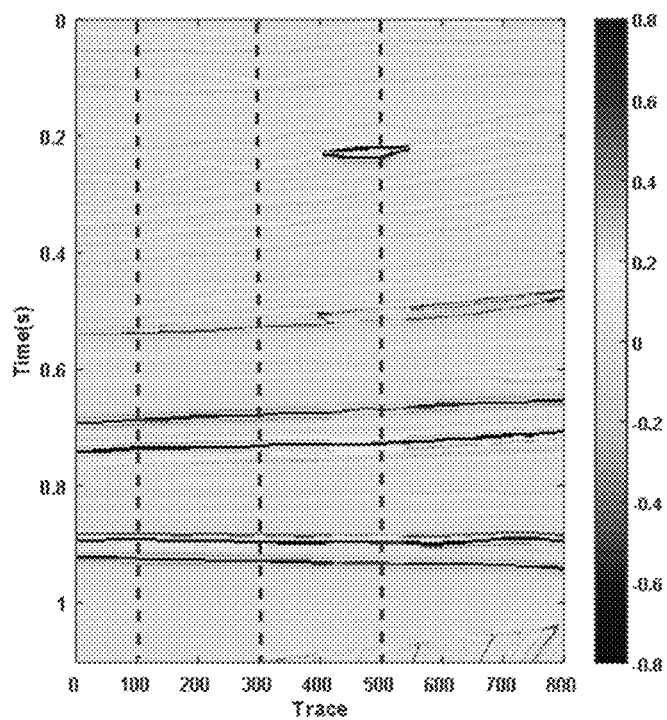
Figure 7C:
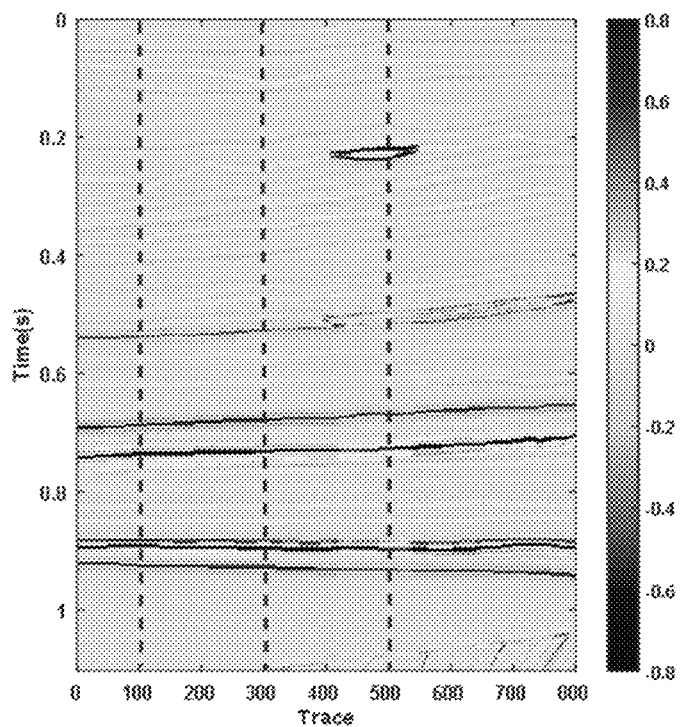
Figure 8A:
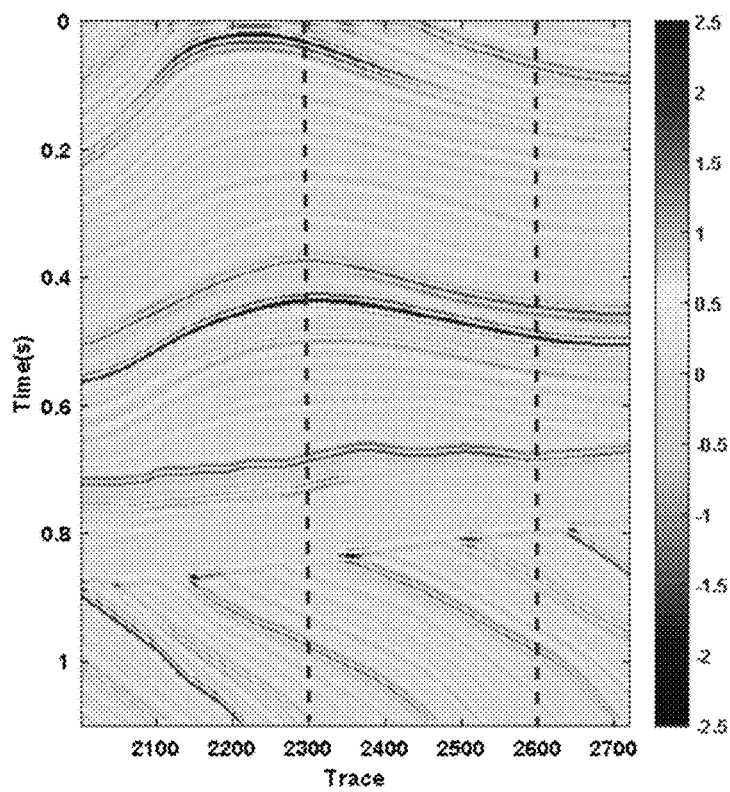
Figure 8B:
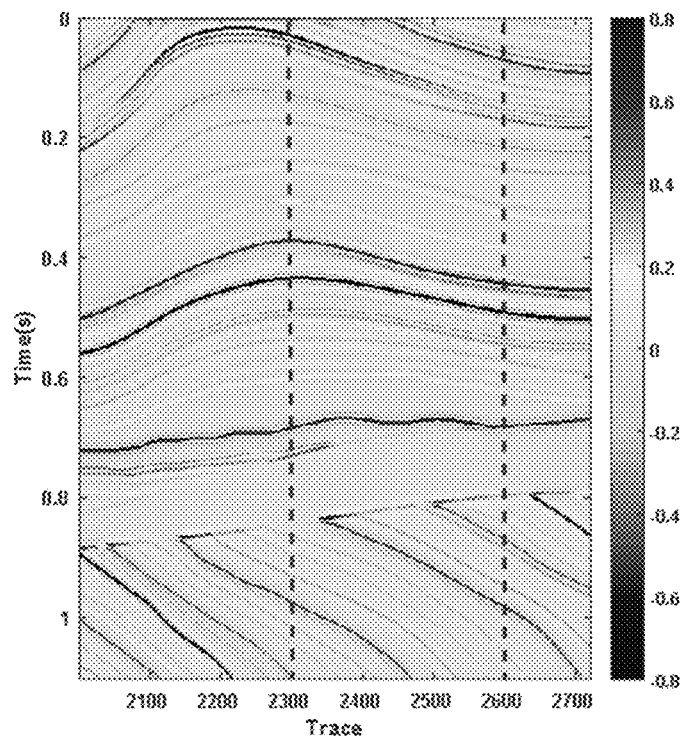
Figure 8C:
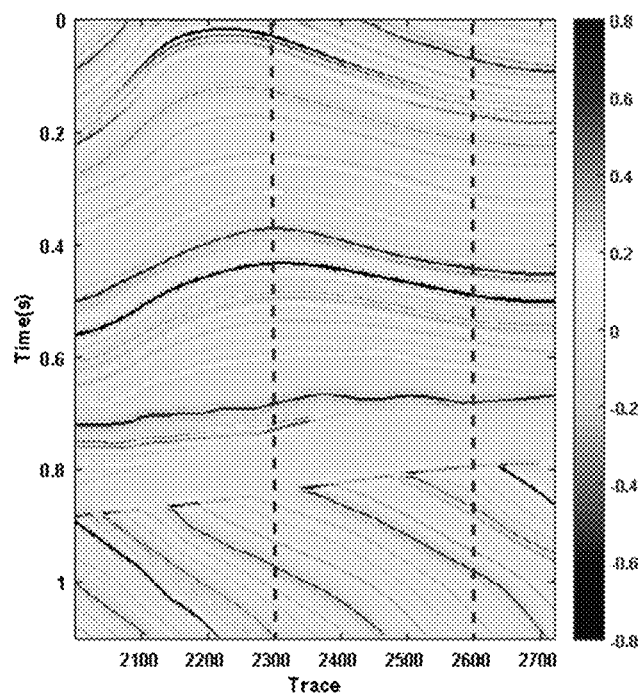
Figure 9A:
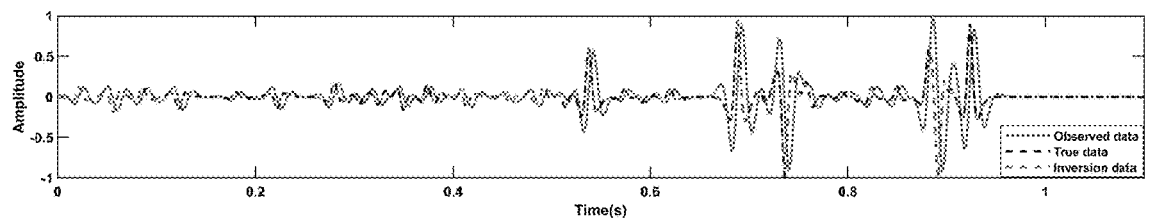
Figure 9B:
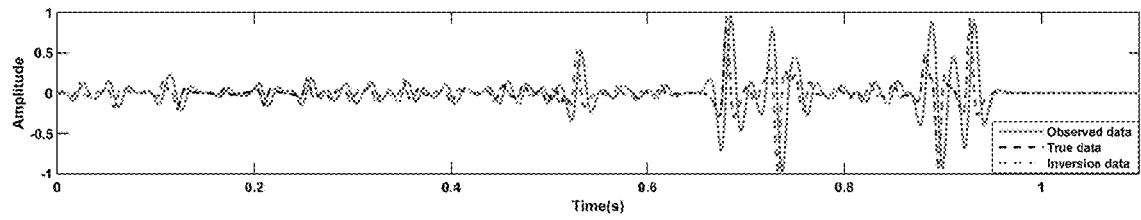
Figure 9C:
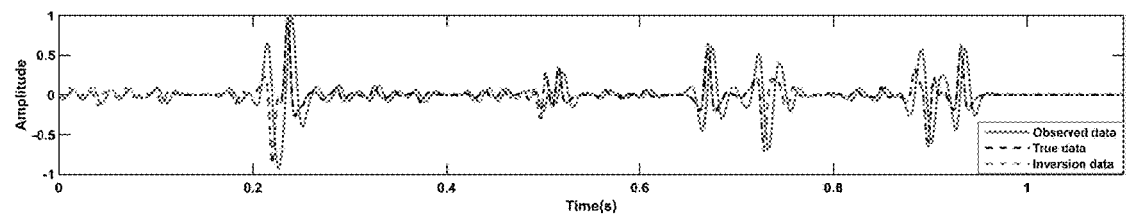
Figure 9D:
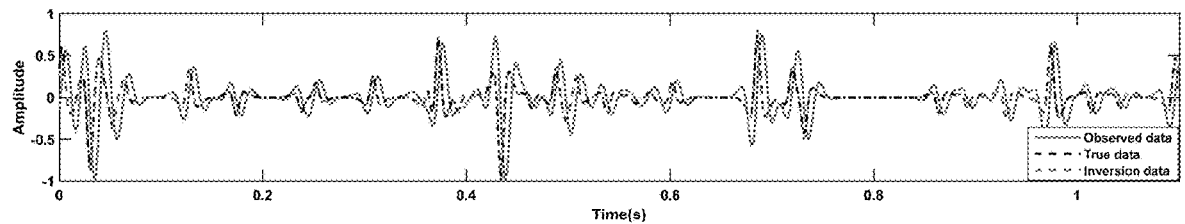
Figure 9E:
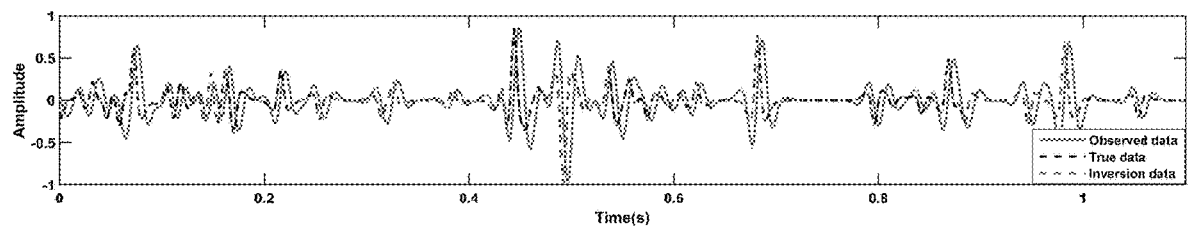

In order to verify the effectiveness of ADMM-SRINet, the network was used to invert a model test data set. The test set was generated by convoluting the data outside the dotted block in FIG. 5 with a test wavelet (a solid line in FIG. 4A). Inversion results of the test data set are shown in FIGS. 7A-7C and FIGS. 8A-8C, wherein FIG. 7A and FIG. 8A show observed data, FIG. 7B and FIG. 8B show a genuine solution of the inversion, and FIG. 7C and FIG. 8C show an inversion result. Through visual observation, it can be seen that the inversion result is very approximate to the genuine solution, and a resolution is higher than that of the original observed data. In order to clearly observe the inversion result, FIGS. 9A-9E show data at a dotted line position in FIGS. 7A-7C and FIGS. 8A-8C, wherein a solid line represents the observed data, a black dotted line represents the genuine solution of the inversion, and a gray dotted line represents the inversion result. It can be observed that the gray dotted line is almost the same as the black dotted line, which indicates the accuracy of the inversion result. In order to quantificationally analyze the inversion result, correlation coefficients between the observed data and the genuine solution of the inversion were first calculated, which were respectively 0.1712, 0.1907, 0.2239, 0.1973, and 0.1764, and then correlation coefficients between the inversion result and the genuine solution were calculated, which were respectively 0.9967, 0.9969, 0.9952, 0.9936, and 0.9960. Through comparative analysis, it can be seen that there were higher correlation coefficients between the inversion result and the genuine solution, which indicates high inversion accuracy of the method of the present disclosure. In addition, the inversion result was better matched with the genuine solution (may be understood as well data), which indicates that the resolution of the inversion result is improved.

2. Field Seismic Data Example

Figure 10:
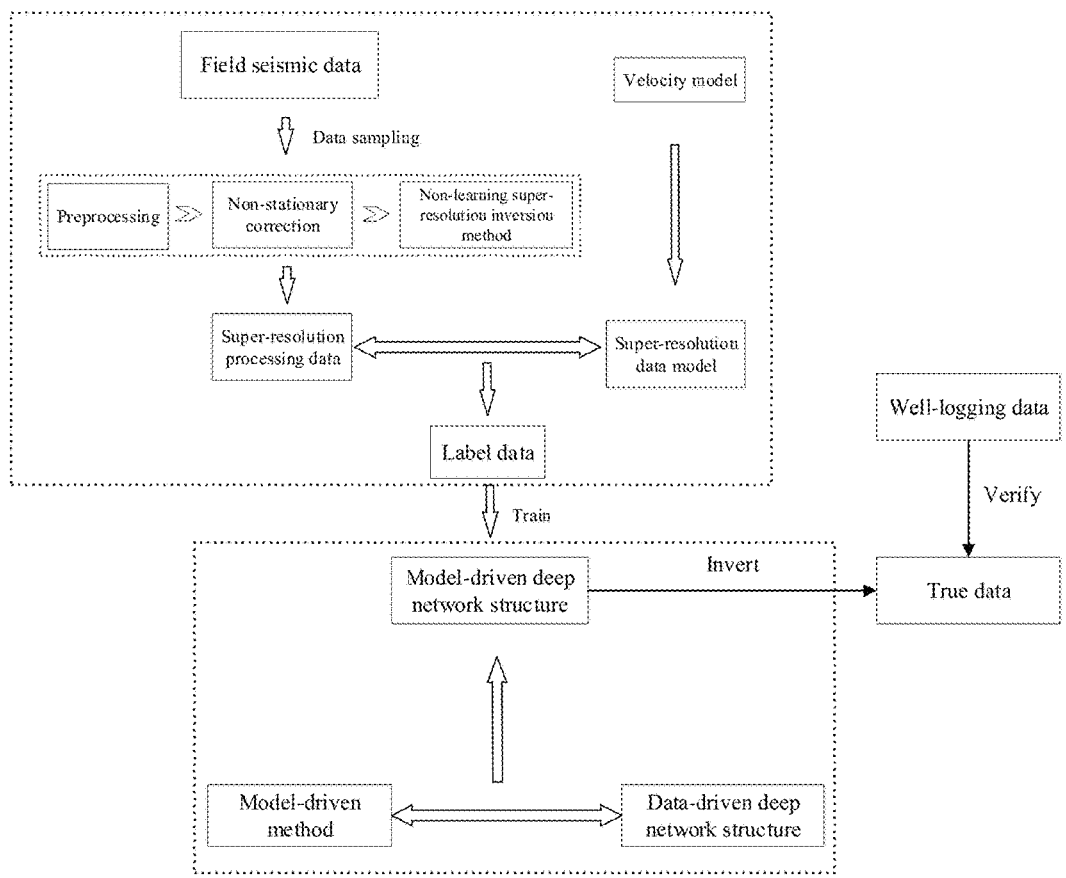
FIG. 10 shows network training and an inversion process of field data.

One section of a post-stack three dimensional data volume of a certain oil field was selected to test the method of the present disclosure. Due to the complex field seismic data, in order to obtain a relatively good inversion result, an inversion process was designed, as shown in FIG. 10. For acquisition of label data, relatively good label data may also be obtained by using a non-learning method processing process besides a model data. Specially for field data, if only a model data-trained network is used to invert the field data, details of an inversion result will be missing or some pseudomorphism will be generated, a main reason is that the model data cannot simulate the same background environment, noise environment, etc. as those of the field data, and a reflection coefficient distribution of the model is not necessarily the same as a reflection coefficient distribution in the filed data, which may affect the inversion result of the field data. Therefore, in order to improve the inversion result of the filed data, a network training strategy was adjusted: the parameters of the model-trained network were used as an initial value, and then the network was finely adjusted by using the label data obtained by the non-learning method, which not only reduces the training time, but also avoids an error brought by the model training.

Figure 11A:
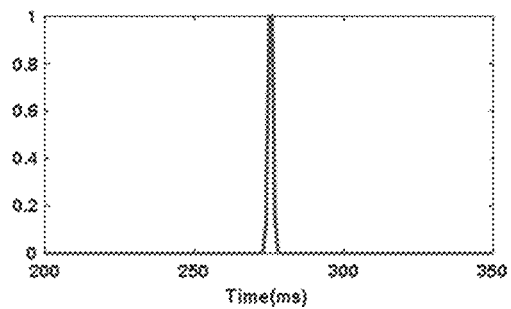
Figure 11B:
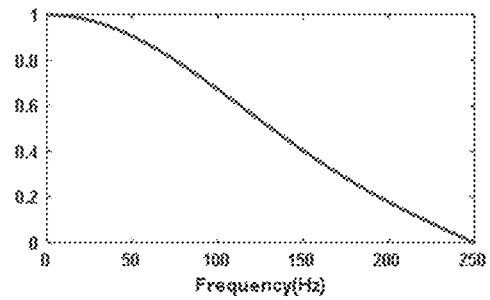
Figure 12A:
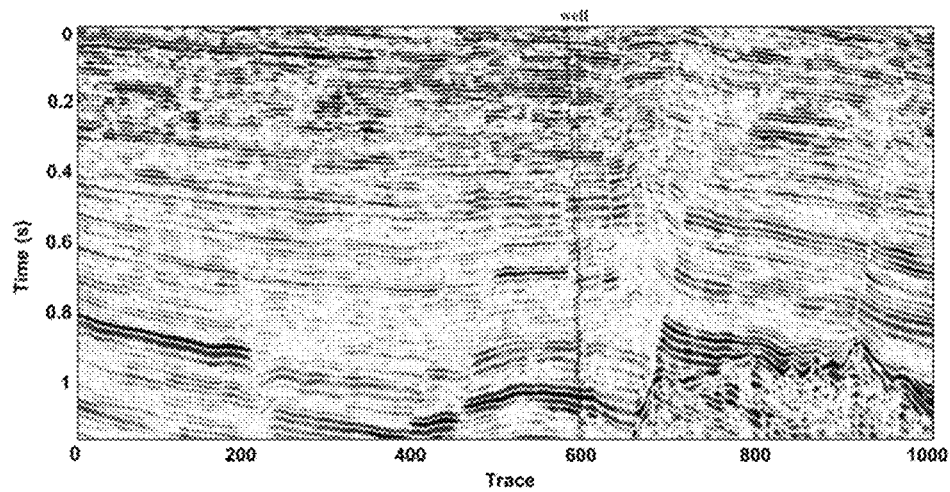
Figure 12B:
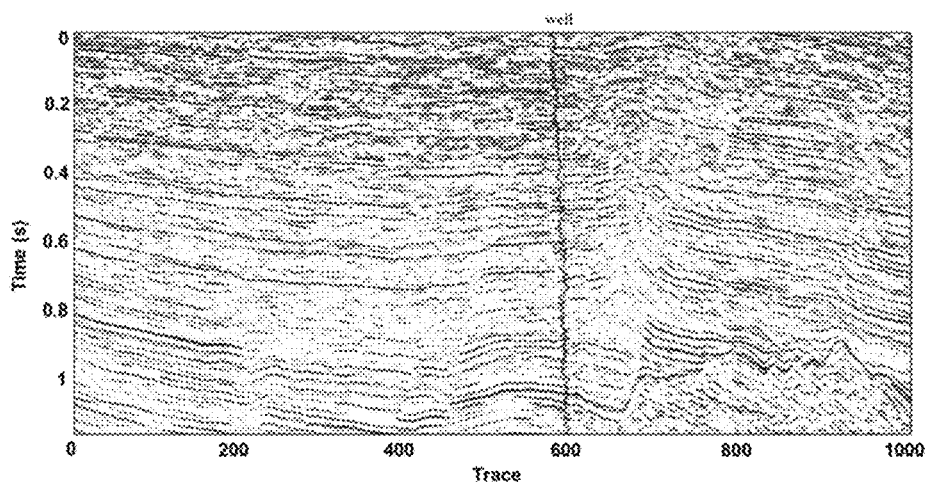
Figure 12C:
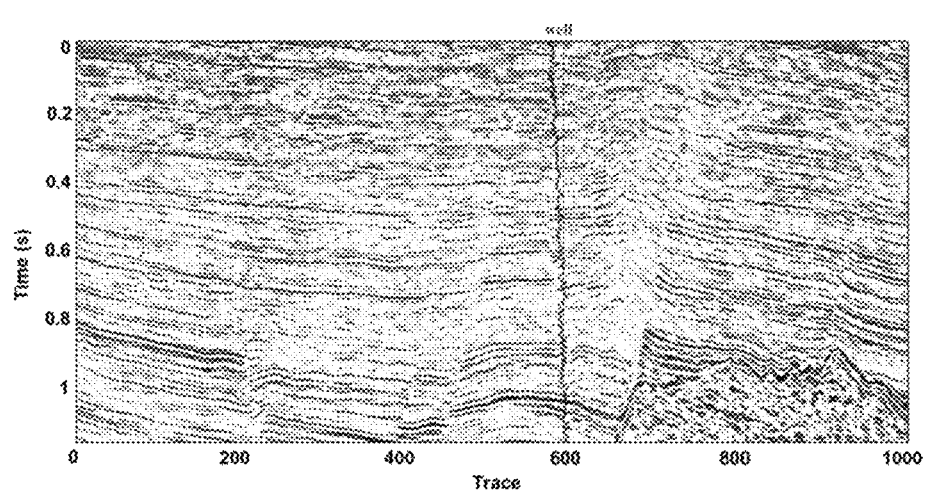
Figure 13A:
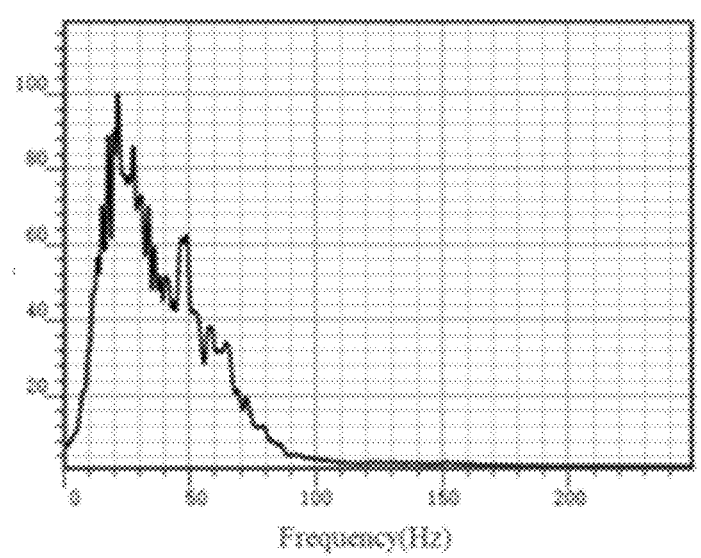
Figure 13B:
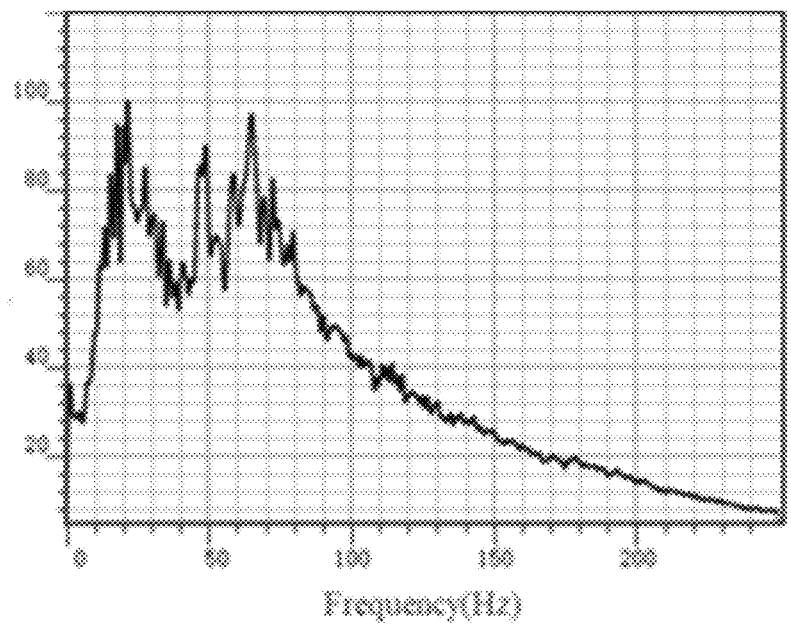
Figure 13C:
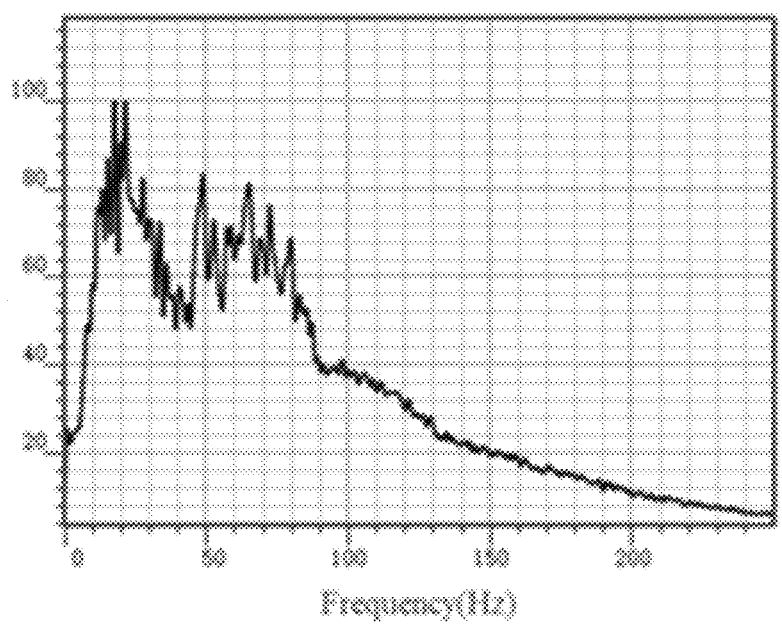

In order to enhance the reliability of the label data, super-resolution data was obtained by using an alternating iterative reflection coefficient inversion method proposed by Wang in 2016, so not only relatively reliable label data may be obtained, but also wavelet information may be obtained. For an inversion of the field data, similarly a band-limited reflection coefficient was inverted. In order to enable the obtained inversion result to have a higher resolution, a wide-band Gaussian wavelet shown in FIG. 11A and FIG. 11B was designed, and different from a Yu wavelet, the wavelet may not only keep low frequency information, but also recover high frequency information to a certain extent. The reflection coefficient obtained by the alternating iterative inversion method was filtered by using the wide-band Gaussian wavelet to obtained band-limited super-resolution data. Because the network had a relatively good initial value, in the present disclosure, 100 traces of super-resolution data were selected as label data, and then a relatively good inversion result may be obtained. FIGS. 12A-12C show an inversion result of the field data; wherein FIG. 12A shows field observed data, there were total 1001 traces, and data of each trace included 551 time sampling points, FIG. 12B shows an inversion result obtained by the model-trained network, and FIG. 12C shows an inversion result obtained by the network finely adjusted by using the field data. Through visual observation, it can be found that compared to the observed data, resolutions of the inversion results in FIG. 12B and FIG. 12C are both improved, and a description of a geological structure is clearer. But details of the inversion result in FIG. 12B are missing, and a main reason is that the sparseness of the model super-resolution data is different from that of the field data, which causes the inversion result obtained by the model-trained network is sparser. The inversion result in FIG. 12C is more detailed due to a fact that the label data incorporates information of the field data. In order to further compare the inversion results, FIGS. 13A-13C show amplitude spectra of the three inversion results in FIGS. 12A-12C, and it can be found that the inversion results may all expand a frequency band range of the seismic data, and the frequency band range of FIG. 13B is very close to that of FIG. 13C, and close to that of the amplitude spectrum of the Gaussian wavelet in FIG. 11A and FIG. 11B, which indicates that the inversion result of the network has a close relationship with the design of label data. Finally, in order to verify the reliability of the inversion result, an impedance well-logging curve was inserted to the three inversion results in FIGS. 12A-12C, and the well-logging curve was filtered by using a low-pass filter with a cut-off frequency of 250 Hz. Through observation, it can be found that two inversion results of near-well seismic data both match the well-logging curve closely, and the result of FIG. 12C matches the well more closely, which indicates that the reliability of the inversion of the method of the present disclosure is relatively high.

In conclusion, according to the present disclosure, each iteration of ADMM is mapped into each layer of a network, and the proximal operators are learned by using a data-driven method. The method fully combines advantages of a model-driven alternating direction method of multipliers (ADMM) and a data-driven deep learning method, avoids the design of regularization terms and then implements a fast calculation of high-dimensional data. In addition, the present disclosure designs a set of process for obtaining label data and a novel solution for network training, and mainly uses model label data and field label data to train the deep network through a transfer learning strategy, and thus ADMM-SRINet can be used to better invert field data. Finally, the network is used to invert synthetic and filed data, which verifies the effectiveness of the present disclosure.

The above content is only to illustrate the technical ideas of the present disclosure, and cannot be used to limit the scope of protection of the present disclosure. Any changes made on the basis of the technical solutions based on the technical ideas proposed by the present disclosure shall fall within the scope of protection of the claims of the present disclosure.

What is claimed is:

1. A model-driven deep learning-based seismic super-resolution inversion (SRI) method, comprising the following steps:
    1) obtaining seismic data from an oil field and model data and using the seismic data and the model data to produce label data;
    2) mapping each iteration of a model-driven alternating direction method of multipliers (ADMM) to each layer of a deep network, and learning proximal operators by using a data-driven method to complete a construction of a deep network ADMM-SRI;
    3) training the deep network ADMM-SRI by using the label data;
    4) inverting test data by using the deep network ADMM-SRI trained at step 3);
    5) inverting the seismic data from the oil field using the deep network ADMM-SRI; and 6) selecting an oil or gas reservoir using the inverted seismic data from the oil field and performing exploration and/or development of the selected oil or gas reservoir in the oil field.

2. The model-driven deep learning-based seismic super-resolution inversion (SRI) method according to claim 1, wherein at step 2), a proximal form of the model-driven ADMM is shown as formula (1):

$$\begin{cases} r^k = prox_{\rho f}(x^{k-1} - \beta^{k-1}), \\ x^k = prox_{\rho g}(r^k + \beta^{k-1}), \\ \beta^k = \beta^{k-1} + \eta^k(r^k - x^k), \end{cases} \quad (1)$$

wherein two modules $r^k$ and $x^k$ in formula (1) are respectively learned by using a residual convolutional network block, and for a third module $\beta^k$ in formula (1), only a parameter $\eta$ needs to be determined in each iteration; and each iteration process in formula (1) is unrolled to construct the deep network, wherein $prox_{\rho f}(\ )$ and $prox_{\mu g}(\ )$ are proximal operators.

3. The model-driven deep learning-based seismic super-resolution inversion (SRI) method according to claim 2, wherein at step 2), the deep network ADMM-SRI comprises three stages, wherein in a k-th stage, the deep network is composed of three modules comprising the module $r^k$, the module $x^k$, and the module $\beta^k$, wherein the module $r^k$ and the module $x^k$ are configured to calculate values of $r^k$ and $x^k$ by using learning operators;

the module $\beta^k$ is configured to calculate a value of $\beta^k$, and nodes of the three modules are connected via straight lines with a directionality.

4. The model-driven deep learning-based seismic super-resolution inversion (SRI) method according to claim 2, wherein a first learning module in formula (1) is as follow:

$$r^k = \Gamma_{\Theta_k^f}(r^{k-1}, x^{k-1}, \beta^{k-1}, W_T W r^{k-1}, y), \quad (2)$$

wherein $\Gamma_{\Theta_k^f}$ represents a learning operator in a k-th iteration, and wherein a parameter set in the learning operator is represented by $\Theta_k^f$; $r^{k-1}$, $x^{k-1}$, $\beta^{k-1}$, $W^T W r^{k-1}$, and y are inputs of the learning operator $\Gamma_{\Theta_k^f}$, the learning operator is learned by the residual convolutional network block composed of two "Conv+ReLu" layers and one "Conv" layer, wherein "Conv" represents a convolution operator, and "ReLu" represents a linear rectification activation function;

in a residual convolutional network of the residual convolutional network block, each layer comprises 32 convolution kernels with a size of 3×1, and a last layer comprises only one convolution kernel with a size of 3×1×32;

an input of the residual convolutional network comprises physical knowledge in a forward model and gradient information of a loss function in the model-driven deep learning-based seismic super-resolution inversion method.

5. The model-driven deep learning-based seismic super-resolution inversion (SRI) method according to claim 2, wherein a second learning module in formula (1) is configured to learn a mapping relationship $\gamma_{\Theta_k^g}$ between $x^k$ and $p^k$ as follows:

$$x^k = \gamma_{\Theta_k^g}(p^k), \quad (3)$$

wherein $\Theta_k^g$ represents a network parameter in a k-th iteration of the deep network, $p^k = r^k + \beta^{k-1}$, the second learning module is learned by using three residual convolutional network blocks, wherein a structure of each of the three residual convolutional network blocks is equal to a structure of a residual convolutional network configured to learn a first learning operator.

6. The model-driven deep learning-based seismic super-resolution inversion (SRI) method according to claim 2, wherein for the third module in formula (1), only the parameter $\eta$ needs to be determined in each iteration, $\eta$ is considered as a weight in the deep network, and $\eta$ is learned together with other parameters in the deep network from training data.

7. The model-driven deep learning-based seismic super-resolution inversion (SRI) method according to claim 1, wherein at step 2), the label data comprises the model data and field data, wherein:

for the model data, a known velocity model is configured to perform a forward modeling to obtain seismic super-resolution data used as the label data; and for the field data, an acquisition procedure is as follows:

the seismic data is first subjected to a denoising preprocessing and then subjected to a non-stationary correction to obtain stationary seismic data;

a reflection coefficient profile is obtained by using an alternating iterative inversion method, and the reflection coefficient profile is filtered through a wide-band Gaussian or a Yu wavelet to obtain band-limited super-resolution data used as the label data.

8. The model-driven deep learning-based seismic super-resolution inversion (SRI) method according to claim 7, wherein step 3) of training the deep network ADMM-SRI by using the label data specifically comprises:

preliminarily training the deep network by using the model data to enable parameters in the deep network to have an initial value; specifically obtaining the label data from the field data in different target areas, and performing a fine adjustment on the deep network by a transfer learning strategy, and configuring the deep network to invert the field data.

9. The model-driven deep learning-based seismic super-resolution inversion (SRI) method according to claim 8, wherein during the training of the deep network ADMM-SRI, a loss function is as follow:

$$E(\Theta) = 1/N \sum_{i=1}^{N} \|\hat{r}_i - r_i^{gt}\|_2^2, \quad (4)$$

wherein a network parameter is $\Theta = \{\Theta_k^g, \Theta_k^f, \eta^k\}_{k=1}^{N_t}$, N represents a number of training data pairs, $\Theta_k^g$, $\Theta_k^f$ are network parameters in a k-th iteration, $\hat{r}_i$ is an output of the deep network corresponding to an i-th training data pair, and $r_i^{gt}$ is a ground truth solution corresponding to $\hat{r}_i$.

10. The model-driven deep learning-based seismic super-resolution inversion (SRI) method according to claim 9, wherein in formula (4), an optimization is performed by a batch stochastic gradient descent (SGD) method, and a fixed number of iterations is set as a stop condition.

* * * * *